(12) United States Patent
Ying

(10) Patent No.: US 7,789,375 B2
(45) Date of Patent: Sep. 7, 2010

(54) PORTABLE WINCH ASSEMBLY ACTUATED BY AUXILIARY HANDHELD TORQUING DEVICE

(75) Inventor: Vincent Ying, Kunshun (CN)

(73) Assignee: Mojack Distributors, LLC, Wichita, KS (US)

( * ) Notice: Subject to any disclaimer, the term of this patent is extended or adjusted under 35 U.S.C. 154(b) by 15 days.

(21) Appl. No.: 12/326,453

(22) Filed: Dec. 2, 2008

(65) Prior Publication Data

US 2010/0133372 A1    Jun. 3, 2010

(51) Int. Cl.
*B66D 1/22* (2006.01)
(52) U.S. Cl. ........................ 254/344; 254/323
(58) Field of Classification Search ............. 254/342, 254/343, 344, 345, 346, 323
See application file for complete search history.

(56) References Cited

U.S. PATENT DOCUMENTS

| | | | |
|---|---|---|---|
| 3,055,237 A * | 9/1962 | Magnuson | ............... 475/296 |
| 3,936,033 A | 2/1976 | McElroy | |
| 4,161,126 A | 7/1979 | Winzeler | |
| 4,430,909 A * | 2/1984 | Magnuson | ............... 475/330 |
| 4,452,429 A | 6/1984 | Muessel | |
| 4,760,964 A * | 8/1988 | Burandt | ............... 239/265.19 |
| 5,048,799 A | 9/1991 | Aronowitsch et al. | |
| 5,860,635 A | 1/1999 | Morfitt et al. | |
| 6,604,731 B2 | 8/2003 | Hodge | |
| 6,659,430 B2 * | 12/2003 | O'Fallon | ............... 254/344 |
| 6,663,086 B2 | 12/2003 | Huang | |
| 7,000,904 B2 | 2/2006 | Huang | |
| 7,614,609 B1 * | 11/2009 | Yang et al. | ............... 254/344 |

* cited by examiner

*Primary Examiner*—Emmanuel M Marcelo
(74) *Attorney, Agent, or Firm*—Alston & Bird LLP

(57) ABSTRACT

Provided are a portable winch assembly for use in lifting equipment and a planetary reduction gearbox that may be incorporated into existing winch assemblies. The planetary reduction gearbox of the winch assembly includes a primary sun gear, a first plurality of planet gears, a secondary sun gear, a second plurality of planet gears, and a ring gear. The primary sun gear is fitted with a drive head, which is configured for engagement by a handheld torquing device, such as an electric drill. The rotation of the primary sun gear results in the subsequent rotation of a cooperatively engaged gear-driven lifting assembly, to which a rope, cable, or strap may be attached for hoisting equipment. Optionally, a handle assembly may also be included, the handle being selectively disengageable from the lifting assembly, so that the handle may be remain stationary with respect to the rotation of the primary sun gear.

17 Claims, 14 Drawing Sheets

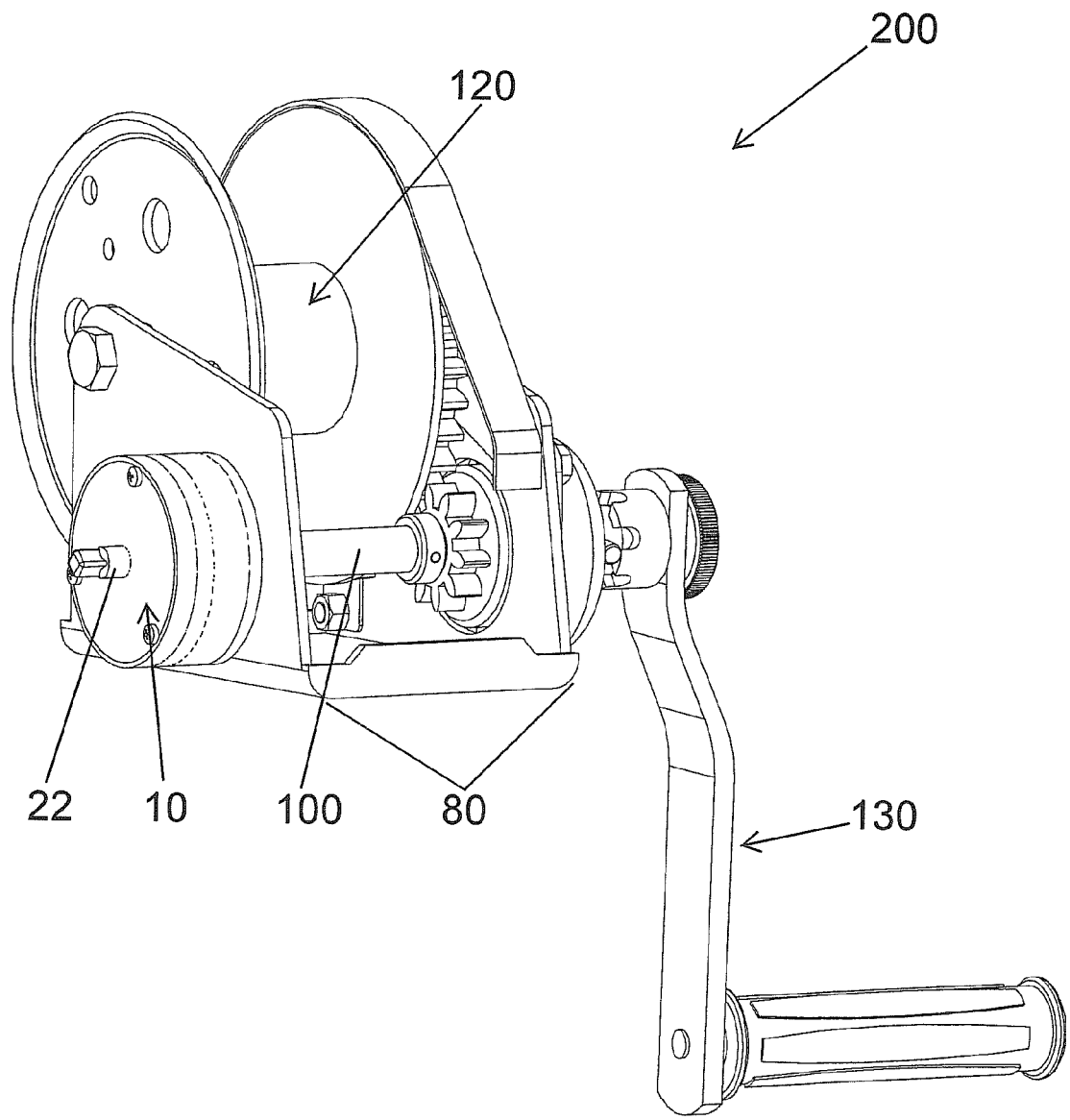
- FIG. 1 -

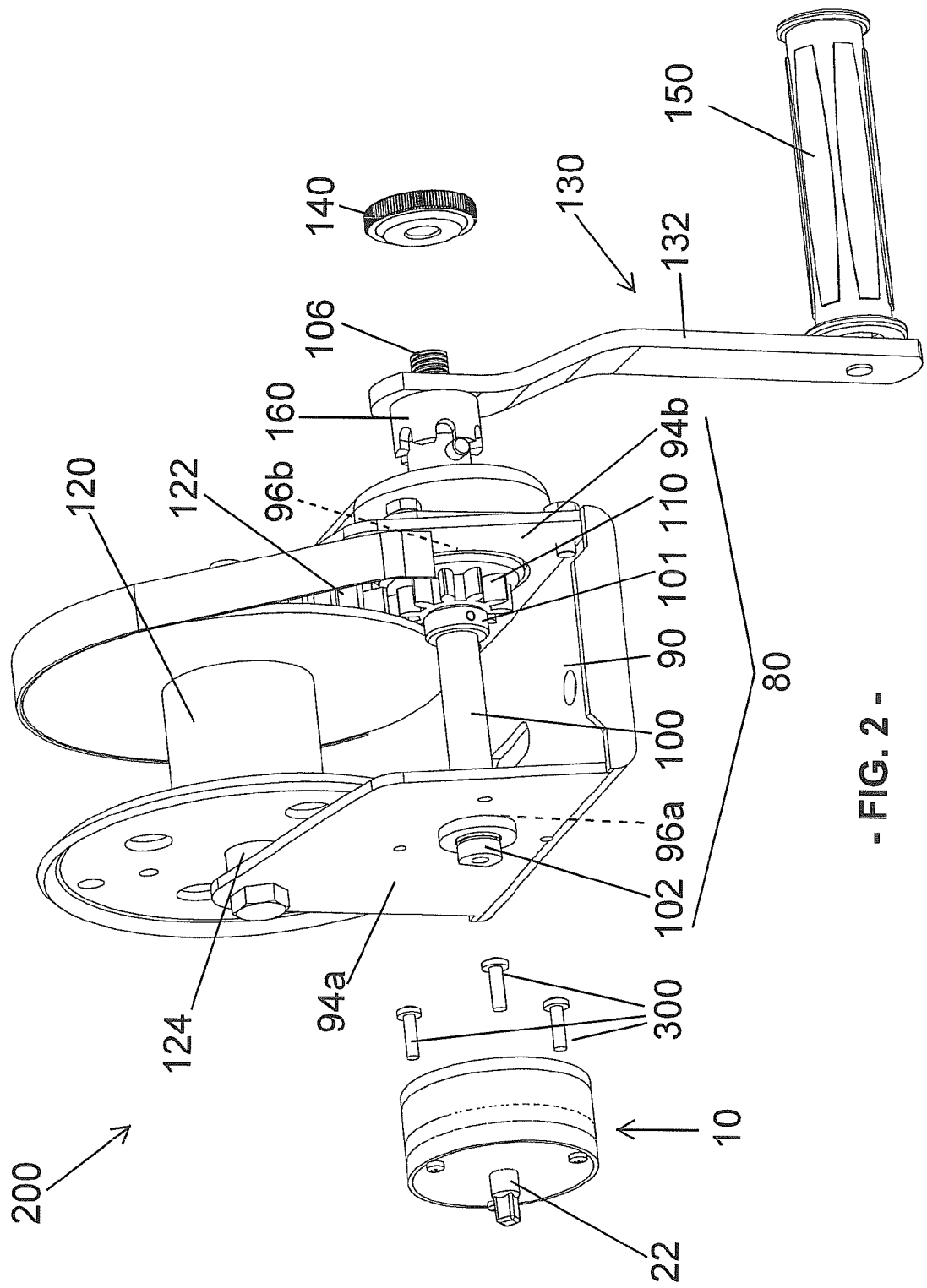
- FIG. 2 -

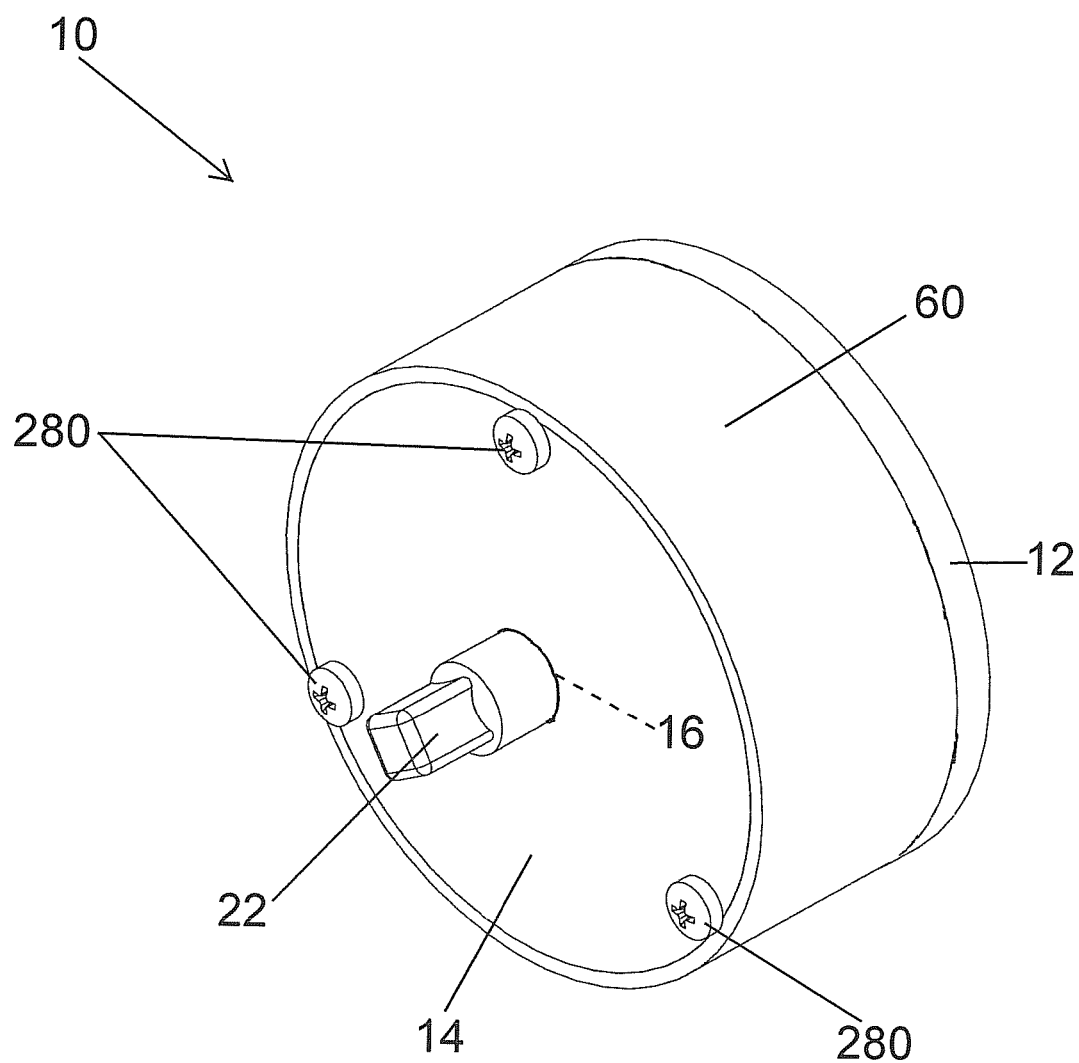
- FIG. 3 -

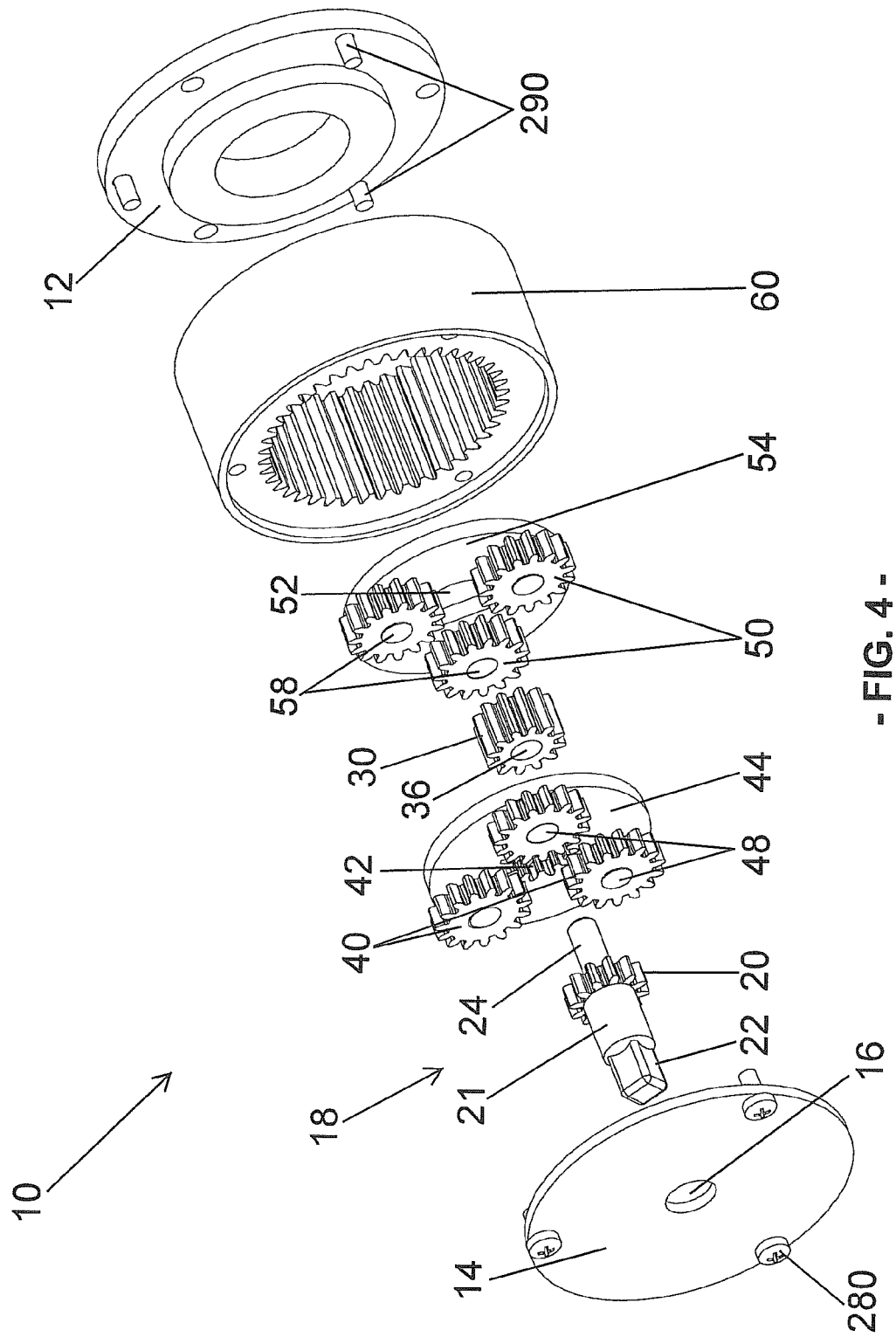
- FIG. 4 -

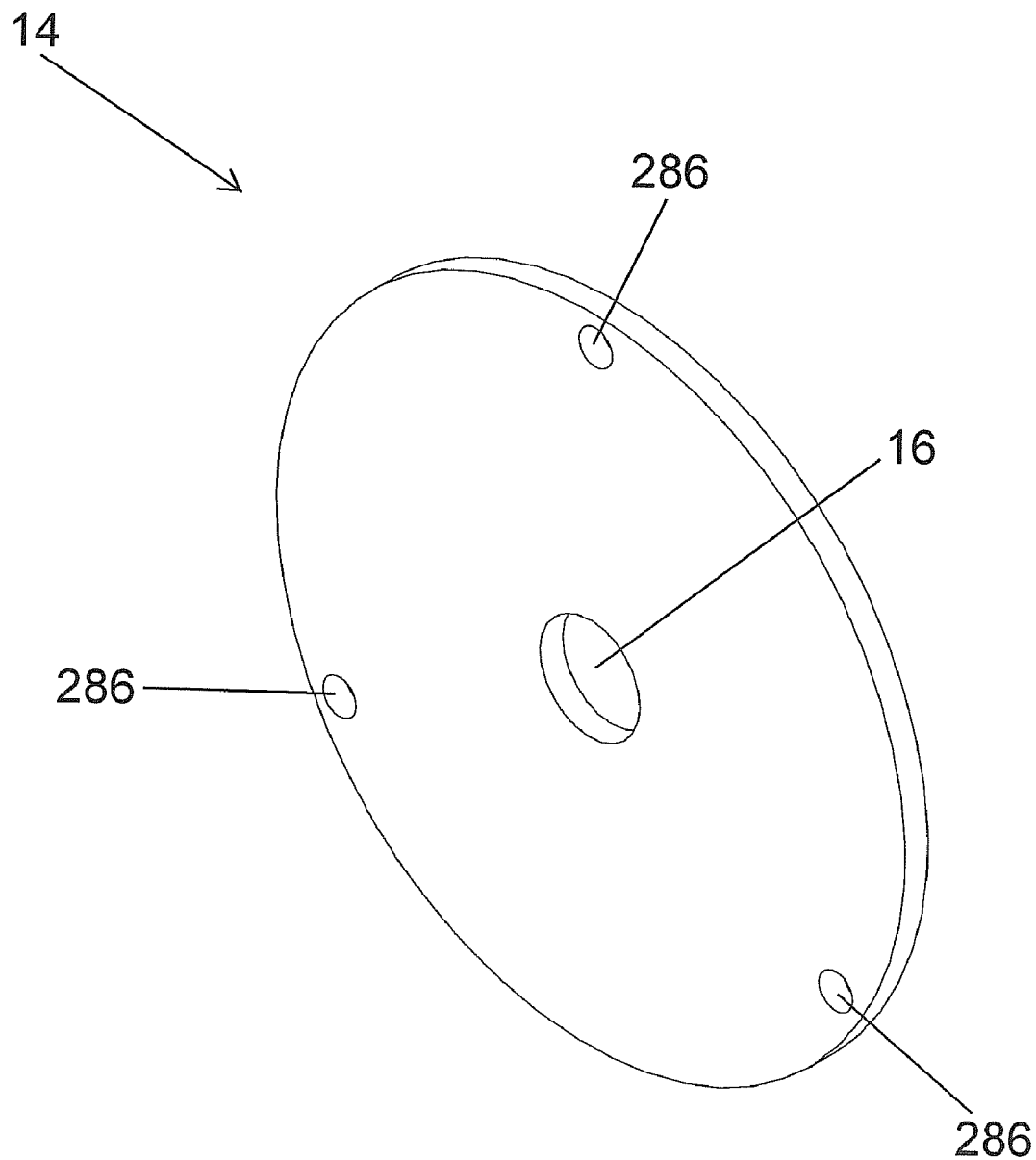
- FIG. 5 -

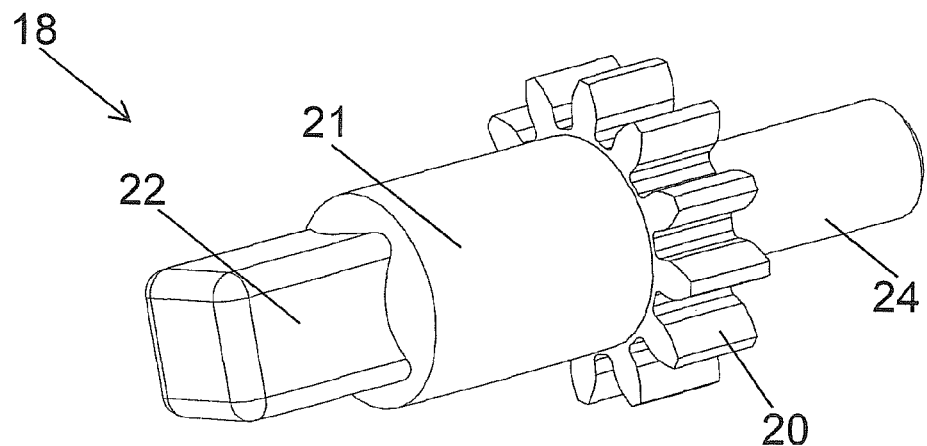
- FIG. 6A -
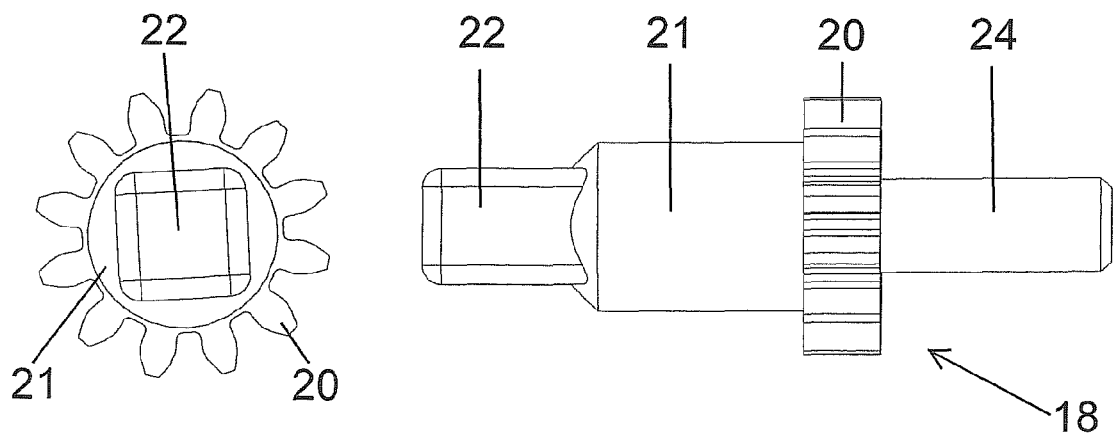
- FIG. 6B -  - FIG. 6C -

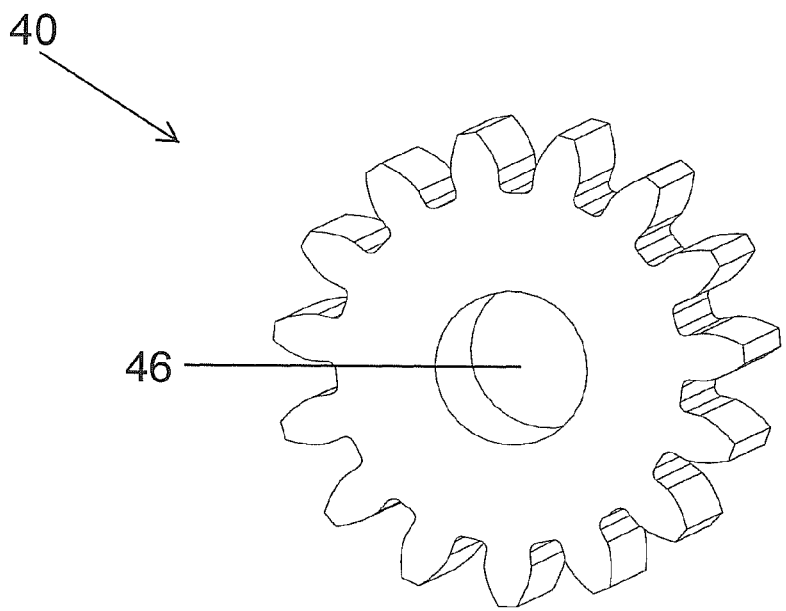
- FIG. 7 -
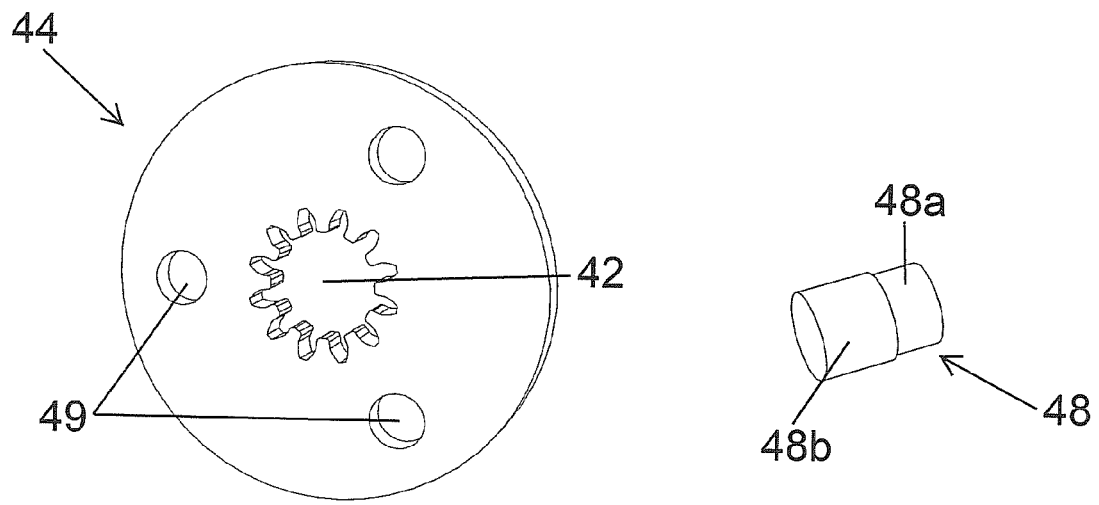
- FIG. 8A -
- FIG. 8B -

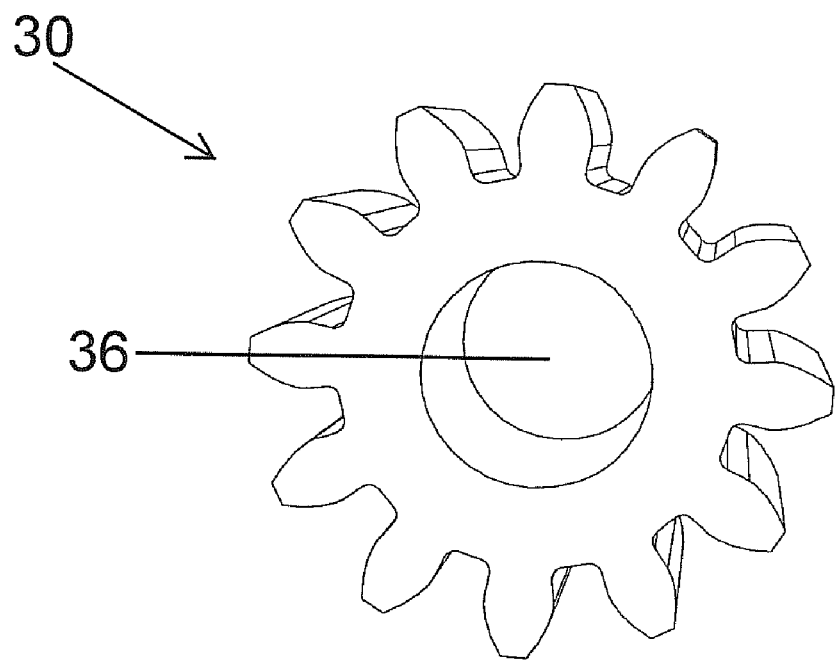
- FIG. 9 -
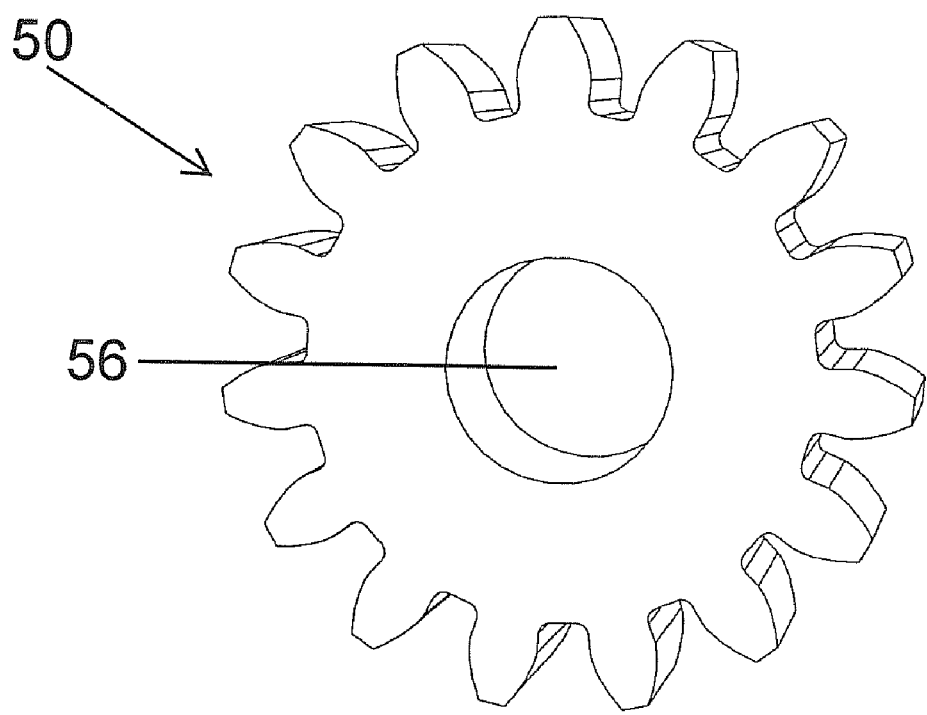
- FIG. 10 -

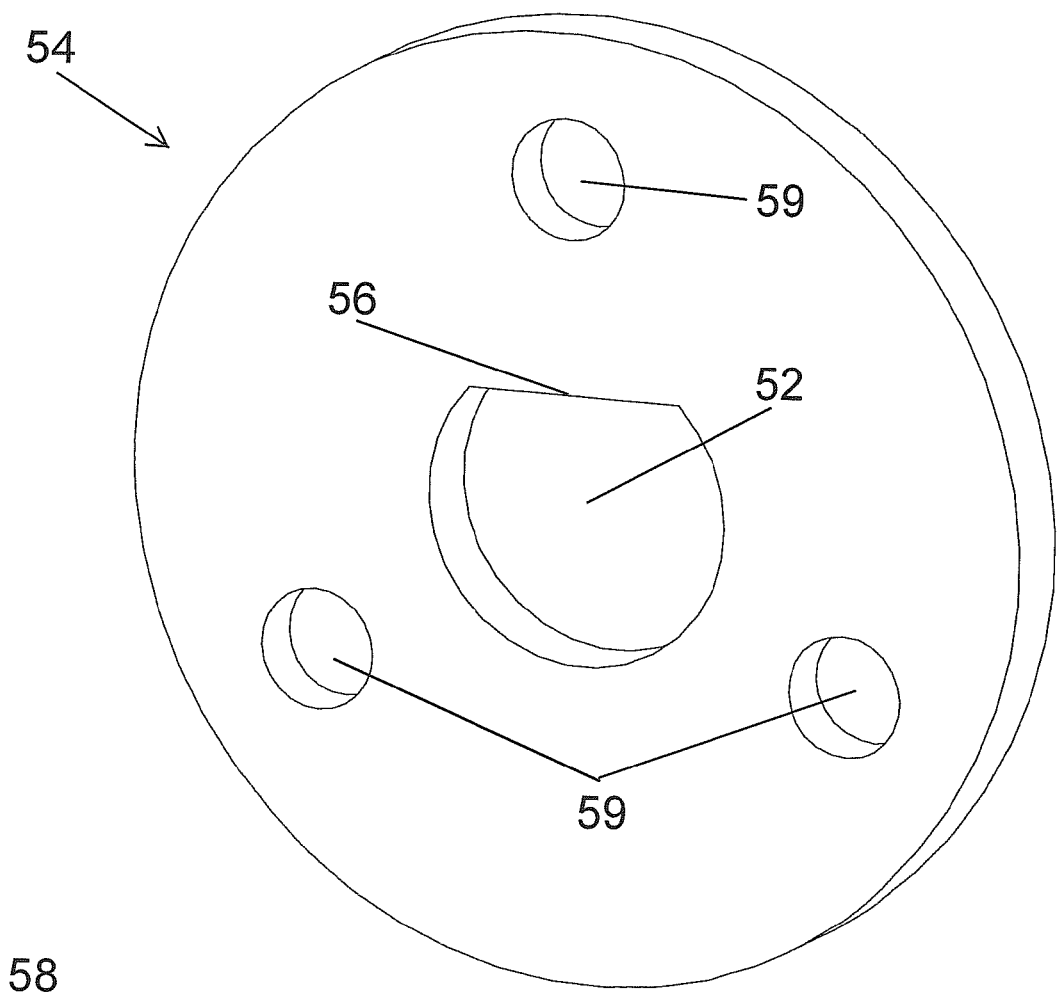
- FIG. 11A -
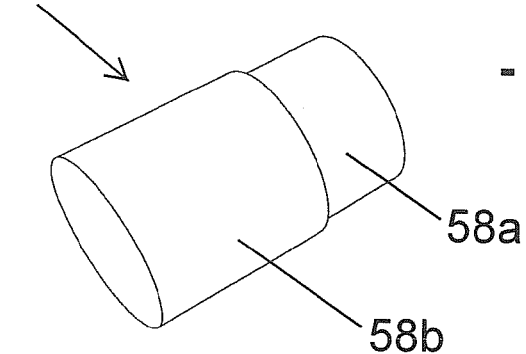
- FIG. 11B -

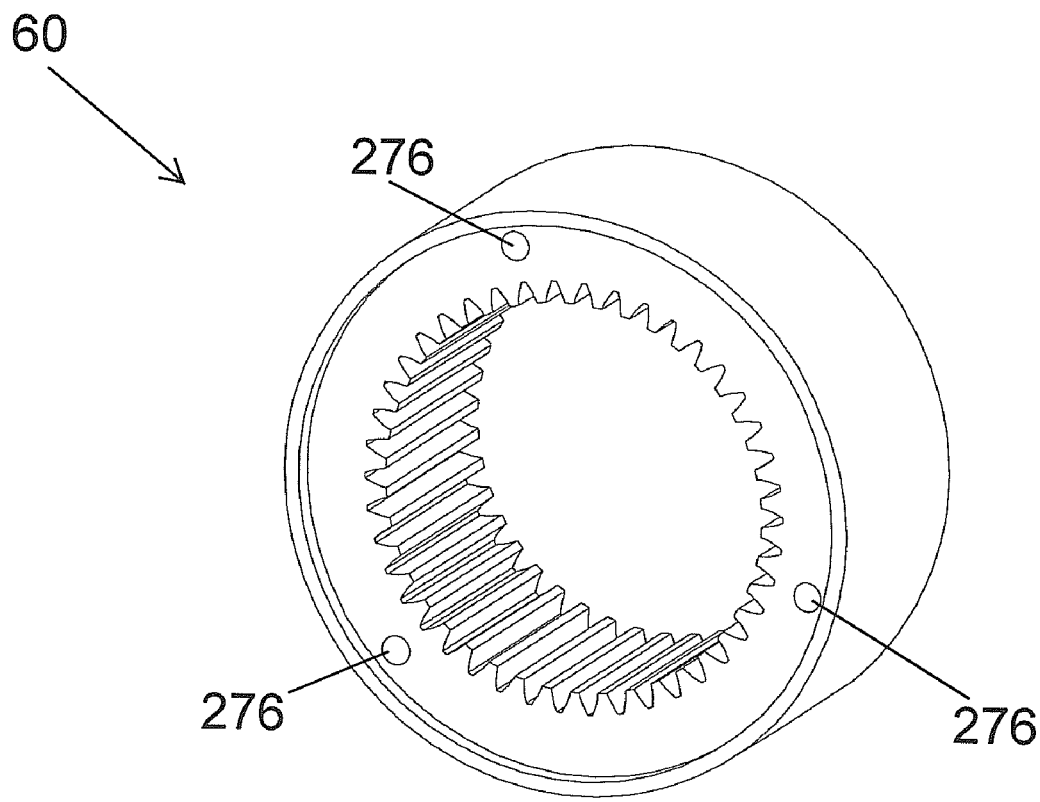
- FIG. 12A -
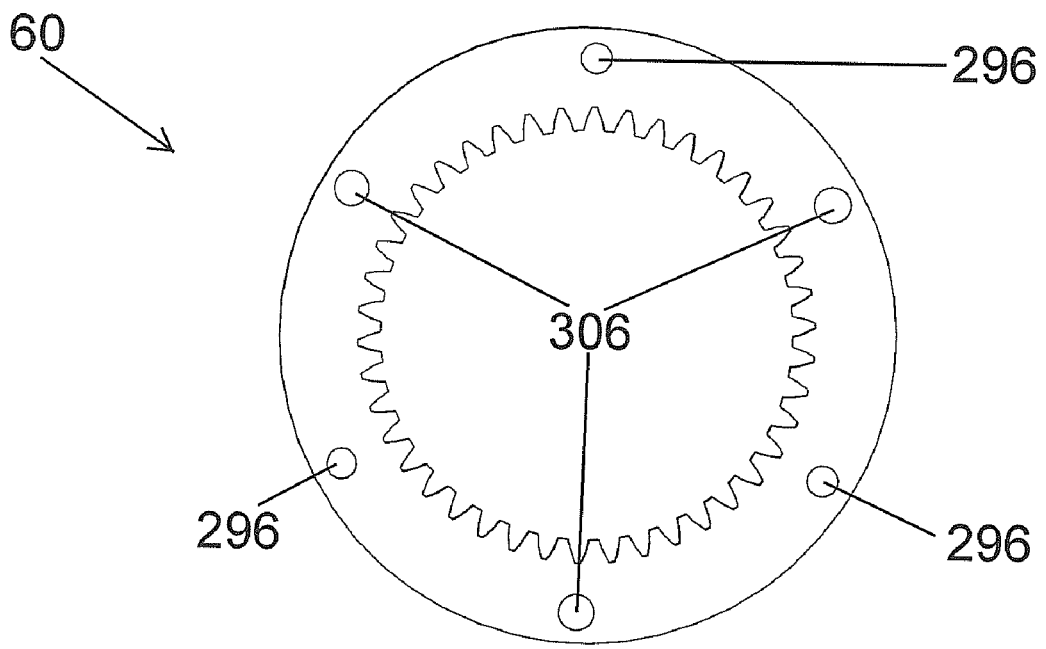
- FIG. 12B -

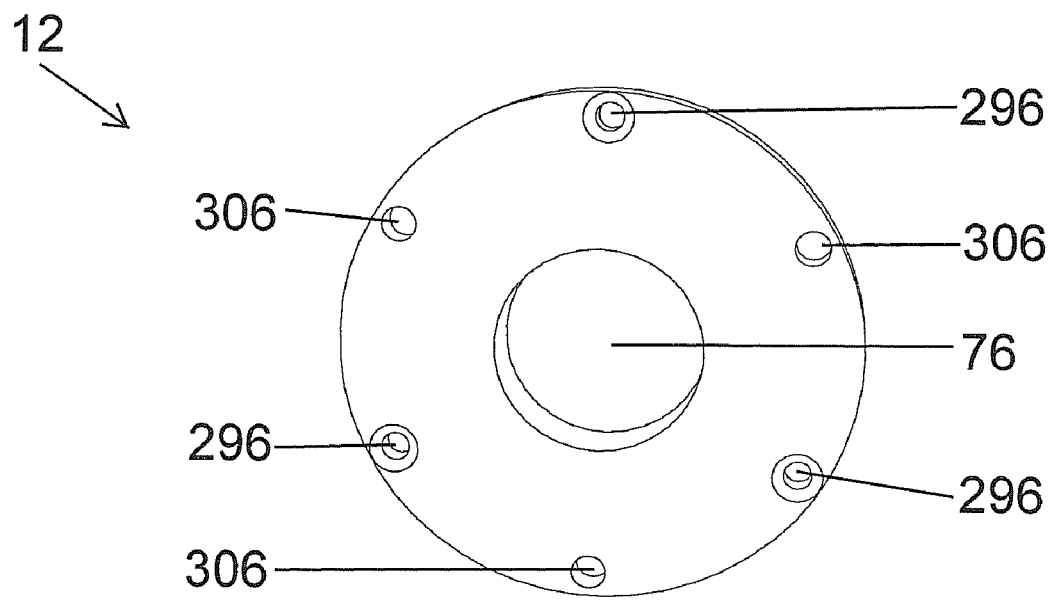
- FIG. 13 -
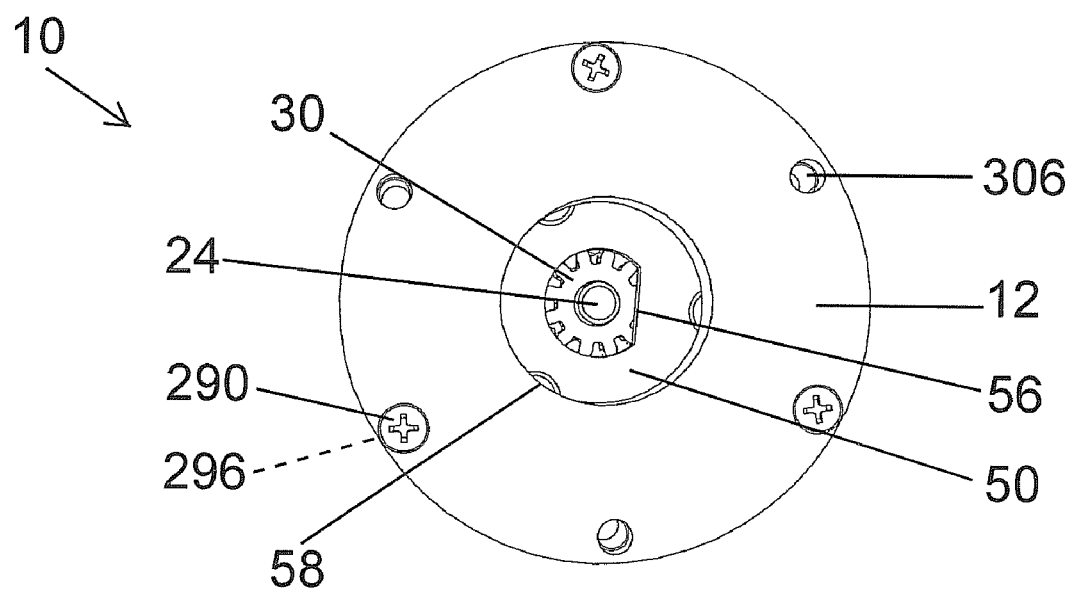
- FIG. 14 -

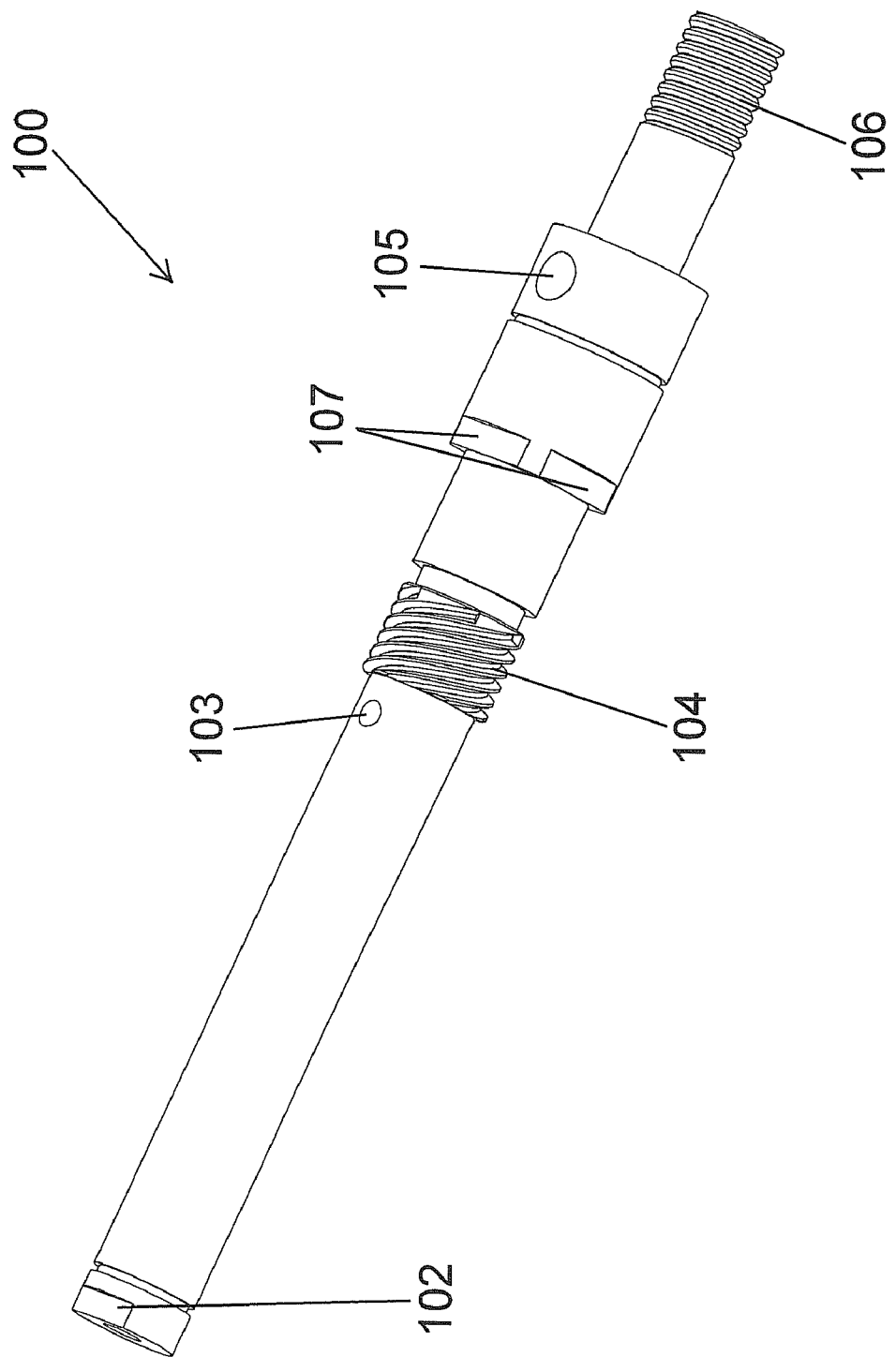
- FIG. 15 -

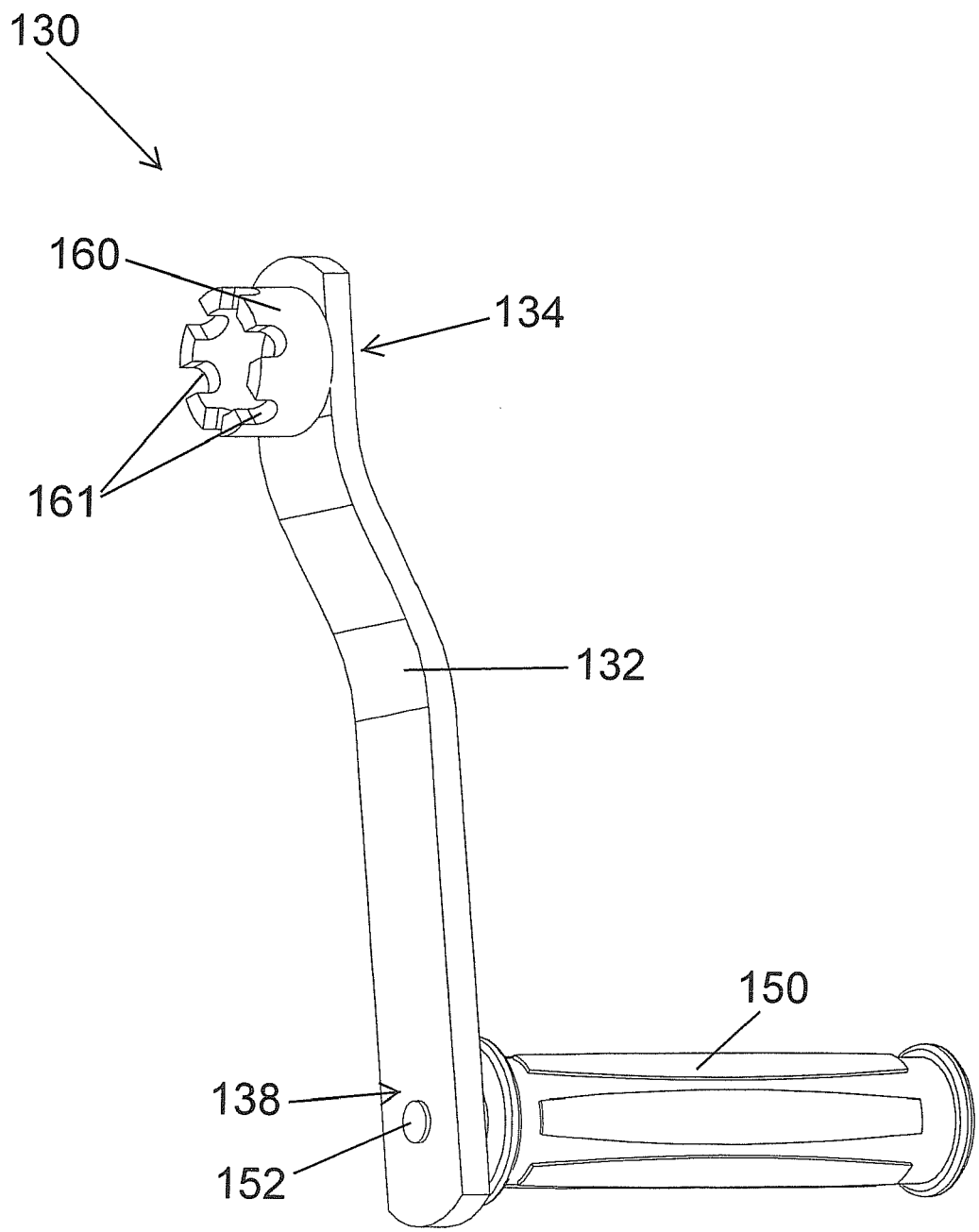
- FIG. 16 -

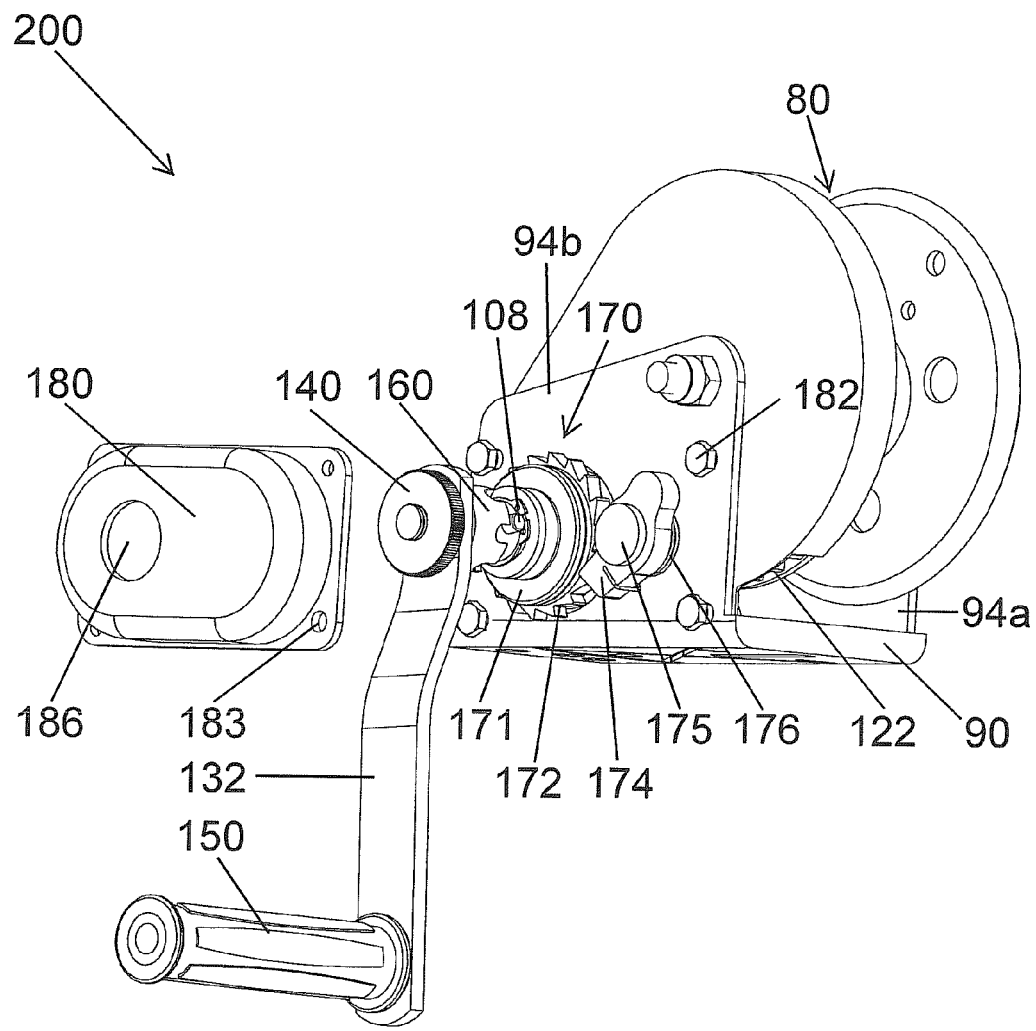
- FIG. 17 -

PORTABLE WINCH ASSEMBLY ACTUATED BY AUXILIARY HANDHELD TORQUING DEVICE

TECHNICAL FIELD

The present disclosure is directed to a portable winch assembly for lifting equipment or containers and, specifically, to a planetary reduction gearbox for the winch assembly, the gearbox being actuatable by an auxiliary handheld torquing device, such as an electric drill.

BACKGROUND

It is often desirable to lift heavy equipment, such as a riding lawnmower, an all-terrain vehicle (ATV), or a jet ski, to service, clean, or transport the equipment (e.g., by loading onto a trailer). Typically, a winch is employed for hoisting the equipment to a desired height. The winch may be either electrically powered or manually driven, for example, by turning a crank or handle. Similarly, a winch may be used for lifting large or heavy containers for storage or transporting.

While manually operated winches may be easy to use and maintain, they may require a significant amount of force to create the torque necessary to lift a heavy object. Accordingly, not all users may be capable of operating a manual winch. On the other hand, electric winches may lift an object more quickly and with less effort by the user thereof, but may be costly and require more maintenance than a manual winch.

What is needed in the industry is a portable winch that operates on the principles of a manual winch, but which is capable of actuation by an auxiliary electric torquing device, thus simplifying the manufacture and use of the winch assembly.

Further, what would also be desirable is a reduction gearbox that may be incorporated into existing winch assemblies of various sizes to permit actuation by an electric torquing device.

SUMMARY

Provided herein are a portable winch assembly for use in lifting equipment or heavy containers and a planetary reduction gearbox that may be incorporated into existing winch assemblies. The planetary reduction gearbox of the winch assembly includes a primary sun gear, a first plurality of planet gears, a secondary sun gear, a second plurality of planet gears, and a ring gear. The primary sun gear is fitted with a drive head, which is configured for engagement by a handheld torquing device, such as an electric drill. The rotation of the primary sun gear results in the subsequent rotation of a cooperatively engaged gear-driven lifting assembly, to which a rope, cable, or strap may be attached for hoisting equipment. Optionally, a handle assembly may also be included, the handle being selectively disengageable from the lifting assembly, so that the handle may be remain stationary with respect to the rotation of the primary sun gear.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 is a perspective view of a portable winch assembly, according to the present disclosure;

FIG. 2 is a partially exploded perspective view of the portable winch assembly of FIG. 1;

FIG. 3 is a perspective view of a planetary reduction gearbox, according to the present disclosure;

FIG. 4 is an exploded view of the planetary reduction gearbox of FIG. 3;

FIG. 5 is a perspective view of a reduction gearbox cover of the planetary reduction gearbox of FIG. 3;

FIG. 6A is a perspective view of a primary sun gear of the planetary reduction gearbox of FIG. 3;

FIG. 6B is a plan view of one end of the primary sun gear of FIG. 6A;

FIG. 6C is a plan side view of the primary sun gear of FIG. 6A;

FIG. 7 is a perspective view of a first planet gear for use within the planetary reduction gearbox of FIG. 3;

FIG. 8A is a perspective view of a first planet carrier for use in conjunction with the first planet gear of FIG. 7;

FIG. 8B is a perspective view of a planetary gear pin for use in conjunction with the first planet gear of FIG. 7 and the first planet carrier of FIG. 8A;

FIG. 9 is a perspective view of a secondary sun gear for use within the planetary reduction gearbox of FIG. 3;

FIG. 10 is a perspective view of a second planet gear for use within the planetary reduction gearbox of FIG. 3;

FIG. 11A is a perspective view of a second planet carrier for use in conjunction with the second planet gear of FIG. 10;

FIG. 11B is a perspective view of a planetary gear pin for use in conjunction with the second planet gear of FIG. 10 and the second planet carrier of FIG. 11A;

FIG. 12A is a perspective view of a ring gear for use within the planetary reduction gearbox of FIG. 3;

FIG. 12B is a plan side view of the ring gear of FIG. 12A;

FIG. 13 is a perspective view of gearbox base for use within the planetary reduction gearbox of FIG. 3;

FIG. 14 is a rear plan view of one end of the planetary reduction gearbox of FIG. 3;

FIG. 15 is a perspective view of a rotatable shaft for use within a lift assembly, as shown in FIG. 2;

FIG. 16 is a perspective view of a handle assembly for use within the portable winch assembly of FIG. 1; and FIG. 17 is a perspective view of a ratchet subassembly for use within the portable winch assembly of FIG. 1.

DETAILED DESCRIPTION

Detailed reference will now be made to the drawings in which examples embodying the present subject matter are shown. The detailed description uses numerical and letter designations to refer to features of the drawings.

The drawings and detailed description provide a full and written description of the present subject matter, and of the manner and process of making and using various exemplary embodiments, so as to enable one skilled in the pertinent art to make and use them, as well as the best mode of carrying out the exemplary embodiments. However, the examples set forth in the drawings and detailed description are provided by way of explanation only and are not meant as limitations of the disclosure. The present subject matter thus includes any modifications and variations of the following examples as fall within the scope of the appended claims and their equivalents.

It is to be understood by one of ordinary skill in the art that the following discussion simply describes exemplary embodiments and is not intended as limiting the broader aspects of the present disclosure.

FIG. 1 illustrates a winch assembly 200, according to the present disclosure. The winch assembly 200 includes a planetary reduction gearbox 10, a lift assembly 80, and an optional handle assembly 130. As will be discussed in greater detail, the lift assembly 80 is positioned centrally between the planetary reduction gearbox 10 and the handle assembly 130. The planetary reduction gearbox 10 and the handle assembly 130 are located along opposite ends of a rotatable shaft 100, such that rotation introduced at the planetary reduction gearbox 10 may be translated through the shaft 100 to a spool 120 and, optionally, to the handle assembly 130. Such rotation may be introduced by employing an auxiliary torquing device, such as an electric drill, the drill chuck being fitted over a drive head 22 extending from the planetary reduction gearbox 10.

The arrangement of the main components of the winch assembly 200 may be seen in FIG. 2. The lift assembly 80 includes a horizontal center portion, or base, 90, from which project, on either side, vertically extending side walls 94a, 94b. The side walls 94a, 94b have bores 96a, 96b, respectively, defined therethrough, through which bores 96a, 96b the rotatable shaft 100 may be positioned. The shaft 100, which is shown in greater detail in FIG. 15, engages a lift gear 110 that acts in cooperation with a spool gear 122 connected to the spool 120. The spool 120 may be held by a spool axle 124, about which axle 124 the spool 120 rotates. A rope, cable, or strap (not shown) may be wound around the spool 120, the rope, cable, or strap being suitable for attachment to a weight to be lifted by the winch assembly 200.

The planetary reduction gearbox 10 may be attached to the exterior of the vertical side wall 94a, using screws 300 fitted through corresponding holes in the side wall 94a, the attachment resulting in an end 102 of the shaft 100 extending within the planetary reduction gearbox 10. Provided the shaft 100 has an attachment end configured to engage the planetary reduction gearbox 10, as will be discussed in detail herein, the gearbox 10 may be attached to any of a variety of sizes or types of winch lift assemblies. The opposite end 106 of the shaft 100 may be a threaded end for connection with the optional handle assembly 130 (shown in more detail in FIG. 16). The handle assembly 130 may be secured to the threaded end 106 of the shaft 100 by a knurled nut 140.

A closer view of the planetary reduction gearbox 10 may be seen in FIGS. 3 and 4. As shown in FIG. 3, a ring gear 60 encircles the central portion of the gearbox 10. A reduction gearbox cover 14 is secured to one end of the ring gear 60 by screws 280. A gearbox base 12 opposite the cover 14 is secured to the ring gear 60 on the opposite side by screws (290, shown most clearly in FIG. 14). A drive head 22, which is part of a primary sun gear subassembly 18, extends through a passage 16 in the reduction gear cover 14, the drive head 22 being shaped and sized for engagement with a chuck (not shown) of an auxiliary handheld torquing device, such as an electric drill.

FIG. 4 shows the component parts of the planetary reduction gearbox 10. The reduction gearbox cover 14 (also shown in FIG. 5) includes the centrally located passage 16 therethrough for receipt of the drive head 22 and a plurality of apertures (286) for receipt of screws 280 for connection to the ring gear 60. The primary sun gear subassembly 18 (shown in FIGS. 6A through 6C) is configured with a primary sun gear 20 and a drive head 22, which is generally square in shape and which may be engaged by a drill chuck or like device, as described above.

Because the drive head 22 is square and the passage 16 is circular, the primary sun gear subassembly 18 is also provided with a drive gear neck 21 having a circular cross-section, the drive gear neck 21 being located between the drive head 22 and the primary sun gear 20. The drive gear neck 21 has a diameter slightly smaller than that of the passage 16 to permit rotation of the drive gear neck 21 within the passage 16. A drive shaft 24 is located opposite the drive head 22 and emanating from the primary sun gear 20.

The primary sun gear 20 interacts with a first plurality of planet gears 40 (one of which is shown in FIG. 7). In one aspect, three planet gears 30 are employed with the primary sun gear 20, each of the gears 20, 30 having the same thickness, thereby ensuring full surface contact between the involute teeth of the gears 20, 30. Each of the first planet gears 40 is positioned over a planet gear axle 48, the planet gear axles 48 being housed within, and extending from, a first planet carrier 44 (as shown in greater detail in FIGS. 8A and 8B).

In addition to the holes (49) for the axles 48, the first planet carrier 44 includes a centrally located aperture 42 shaped to accommodate a secondary sun gear 30. The secondary sun gear 30 (also shown in FIG. 9) fits within the aperture 42 in the first planet carrier 44, and the drive shaft 24 is positioned through an opening 36 in the center of the secondary sun gear 30. Thus, the movement of the primary sun gear 20 dictates the movement of the secondary sun gear 30.

The secondary sun gear 30 has a thickness that enables the secondary sun gear simultaneously to fit through the aperture 42 and to engage the second plurality of planet gears 50 (one of which is shown in FIG. 10). Each of the second plurality of planet gears 50 is positioned over a planet gear axle 58, the planet gear axles 58 (shown in FIG. 11B) being housed within, and extending from, a second planet carrier 54. The second planet carrier 54 also includes a centrally located aperture 52, the aperture 52 defining the shape of a truncated circle (as shown in greater detail in FIG. 11A) for receipt of the rotatable shaft 100 of the lift assembly 80.

A ring gear 60 encircles the first plurality of planet gears 40 and the second plurality of planet gears 50. The ring gear 60 (shown in FIGS. 12A and 12B) includes a number of screw holes on each side for receipt of screws 280 for attachment of the reduction gearbox cover 14 and screws 290 for attachment of the gearbox base 12.

The primary sun gear 20 has a predetermined diameter and number of gear teeth. The primary sun gear 20 interacts with the first plurality of planet gears 40. The first planet gears 40 have a greater number of teeth than the primary sun gear 20. In one aspect, the secondary sun gear 30 has the same number of teeth as the primary sun gear 20, but may have a greater thickness. Finally, the second plurality of planet gears 50 may have the same number of teeth as the first plurality of planet gears 40 (i.e., more than either of the primary sun gear 20 or the secondary sun gear 30). The ring gear 60, which is engaged with both the first plurality of planet gears 40 and the second plurality of planet gears 50 may have, for example, from about 3 to about 5 times as many teeth as the primary sun gear 20. In one embodiment, the primary sun gear and the secondary sun gear may have 12 teeth each, while each of the planet gears has 15 teeth and the ring gear has 42 teeth. Such a gearbox system results in a significant reduction in the amount of revolutions outputted from planetary reduction gearbox 10 as compared to those inputted to drive head 22, and a corresponding increase in torque outputted from planetary reduction gearbox 10 as compared to that inputted to drive head 22, thus permitting the lift assembly 80 to hoist a heavy object.

Returning now to the drawings, FIG. 5 illustrates the reduction gearbox cover 14 with its centrally located aperture 16. The reduction gearbox cover 14 has a diameter sized to fit within the interior perimeter of the ring gear 60, as shown in FIG. 3. For attachment to the ring gear 60, the reduction gearbox cover 14 may further include a number of drilled, bored, or punched holes 286 around the periphery thereof, the holes 286 being sized and spaced to correspond with holes 276 in the ring gear 60 (as shown in FIG. 12A). Although three holes 286 are shown, other numbers and arrangements of holes may instead be used.

FIGS. 6A, 6B, and 6C show the primary sun gear subassembly 18. The primary sun gear subassembly 18 includes a square-shaped drive head 22, a cylindrical drive neck 21, a primary sun gear 20, and a drive shaft 24. The drive head 22 is configured for attachment of a chuck or like output device of an auxiliary handheld torquing device, such as an electric drill or screwdriver, and may include tapered edges. As previously described, the drive neck 21 is sized to permit rotational movement within the passage (16) in the reduction gearbox cover (14). In one aspect, the drive neck 21 and the drive shaft 24 may have approximately the same length, although the drive neck 21 may have a greater cross-sectional diameter. As shown, the primary sun gear 20 may be outfitted with involute-shaped teeth.

The primary sun gear 20 acts cooperatively with the first plurality of planet gears 40, one of which is shown in FIG. 7. The first planet gears 40 may have a dimensional thickness equal, or approximately equal, to that of the primary sun gear 20. The first planet gears 40 each include an aperture 46 therethrough, the first planet gears 40 being mounted on gear axles 48 (shown in FIG. 8B) extending from the first planet carrier 44 (shown in FIG. 8A) in the direction of the primary sun gear 20 by positioning the gear axles 48 through the apertures 46.

As shown in FIG. 8A, the first planet carrier 44, in addition to having three holes 49 therethrough for receipt of the planet gear axles (48), includes a gear-shaped aperture 42 located centrally through the carrier 44. The gear-shaped aperture 42 corresponds in perimeter shape and size to the secondary sun gear 30 (shown in FIG. 9). The number of planet gears 40, axles 48, and holes 49 may be greater or less than the three shown, provided, of course, that the number of holes and axles matches the number of gears.

The gear axle 48 is shown in FIG. 8B, as having a shape corresponding to two stacked cylinders, one having a slightly smaller diameter than the other. For instance, the smaller cylindrical portion 48a has a diameter and height corresponding to the hole 49 in the first planet carrier 44. The larger cylindrical portion 48b forms the attachment point for the first planet gear 40, thus having a diameter and height corresponding to the aperture 46 through the first planet gear 40, though the height may be slightly greater or less than that of the aperture 46.

The secondary sun gear 30, illustrated in FIG. 9, defines an opening 36 through the center of the secondary sun gear 30. The secondary sun gear 30 may have the same number of teeth as the primary sun gear 20 and may have fewer teeth than each of the second plurality of planet gears 50 with which the secondary sun gear 30 interacts. As mentioned previously, the secondary sun gear 30 may have a thickness, or height, that is significantly more than (for example, double) that of the primary sun gear 20, thereby accommodating the housing of the secondary sun gear 30 within the aperture 42 in the first planet carrier 44.

FIG. 10 shows one of the second plurality of planet gears 50. The second planet gears 50 may have a thickness, or height, that is slightly greater (e.g., 20% more) than that of the first planet gears 40. Each second planet gear 50 has a centrally located aperture 56 for receipt of one of the second gear axles (58, shown in FIG. 11B).

The second planet carrier 54, shown in FIG. 11A, resembles the first planet carrier 44 in that the second planet carrier also has three holes 59 therethrough for receipt of the planet gear axles (58). The second planet carrier 54 further includes a centrally located aperture 52 therethrough, the aperture 52 having a shape resembling a truncated circle. The term "truncated circle" means frusto-circular, that is, a circle having a straight segment, or chord, along a portion thereof, the straight segment being parallel to a diameter of the circle, such that a majority of the shape of the circle remains. For example, one representative aperture may include a circle having a radius of 6.50 millimeters and a segment of truncation being located 4.60 millimeters from the center of the circle.

The second gear axles 58 are illustrated in FIG. 11B. The second gear axles 58 have a similar shape as the first gear axles 48, again with the smaller cylindrical portion 58a being inserted into the apertures 59 in the second planet carrier 54. The gear axles 58 are sized to correspond to the dimensions of the second planet gears 50, with the larger cylindrical portions 58b being fitted within the apertures 56 of the planet gears 50.

FIGS. 12A and 12B show the ring gear 60. One side of the ring gear 60 shown in FIG. 12A includes a plurality of holes 276 for receipt of screws (280) to attach the reduction gearbox cover (14). The opposite side of the ring gear 60, shown in FIG. 12B, includes a plurality of holes 296 for receipt of screws (290) to attach the gearbox base (12). This side of the ring gear 60 also is provided with another plurality of holes 306 for receipt of screws (300) to attach the planetary reduction gearbox 10 to the lift assembly 80 (such attachment being shown in FIG. 2).

The gearbox base 12 is shown in FIG. 13, the gearbox base 12 including a pattern of holes 296, 306, corresponding to that of the ring gear 60. The holes 296 may be countersunk, such that the corresponding screws 290 may be flush with the surface of the gearbox base 12 (as shown in FIG. 14). This flush arrangement permits the planetary reduction gearbox 10 to be positioned in close proximity to the lift assembly 80. The gearbox base 12 has a centrally located aperture 76 through which the rotatable shaft 100 of the lift assembly 80 may be inserted.

FIG. 14 provides a plan view of the rear side of the planetary reduction gearbox 10, the rear side being that side of the gearbox 10 proximate to, or in contact with, the lift assembly 80. As shown, the gearbox base 12 is secured to the ring gear (60) by screws 290 threaded through holes 296. At the center of the illustration, visible within the truncated circle aperture 56 of the second planet carrier 50, is the end of the drive shaft 24. The drive shaft 24 is surrounded by the secondary sun gear 30.

The truncated circle aperture 56 of the second planet carrier 50 is adapted to receive a similarly shaped end portion 102 of the rotatable shaft 100 of the lift assembly 80, the shaft 100 being illustrated in FIG. 15. The shaft 100 includes a gearbox attachment end 102 having a cross-sectional diameter conforming in shape to that of the truncated circle aperture 56. Opposite the gearbox attachment end 102 is a handle attachment end, or threaded end, 106, which may be inserted through a correspondingly sized hole in the strut (132) of the handle assembly (130).

A worm portion 104 is positioned along the shaft 100 between the gearbox attachment end 102 and the handle attachment end 106. The worm portion 104 engages the lift gear 110, as shown in FIGS. 1 and 2. The lift gear 110 may further include a locking portion (101, as shown in FIG. 2) that is secured by a pin positioned through a pin cavity 103, the pin cavity 103 being located in close proximity to the worm portion 104 and between the worm portion 104 and the gearbox attachment end 102. The pin cavity 103 may be bored through the shaft 100 (i.e., bored through the shaft in two places).

A second pin cavity 105 is located along a protruded section of the shaft 100 in proximity to the threaded end portion 106 and between the worm portion 104 and the threaded end portion 106. The second pin cavity 105 is bored through the shaft 100 and is sized to house a pin (108, as shown in FIG. 17). The pin 108 is engageable with the notched collar 160 of the handle assembly 130, as will be discussed below. The protruded section of the shaft 100 further includes a plurality of flat panels 107 that engage a locking spacer (171) of the handle gear assembly (170), as shown in FIG. 17.

The handle assembly 130 is illustrated in FIG. 16. The optional handle assembly 130 is useful in those instances in which manual operation of the winch assembly 200 is desired. When the planetary reduction gearbox 10 is actuated by an electric torquing device, however, the handle assembly 130 may be engaged to rotate along with the shaft 100 or may be disengaged to remain stationary while the shaft 100 is moving. This latter orientation may be especially useful in crowded work areas where the rotation of the handle assembly 130 may pose an impediment to the work of users of the winch assembly 200.

The handle assembly 130 includes a handle strut 132, the strut 132 having an attachment end 134 and a handle end 138. A notched collar 160 may be attached to the handle attachment end 134, such that the notched collar 160 may be engaged with, or disengaged from, the pin 108 (shown in a disengaged position in FIG. 17). The handle strut 132, which is secured to the shaft 100 by a knurled nut (140, as shown in FIG. 17), may be repositioned by loosening or tightening the nut (140) and sliding the attachment end 134 of the handle assembly 130 along the threaded end 106 of the shaft 100.

Securing the nut 140 in a position to engage the notches 161 defined within notched collar 160 with the pin 108 causes the handle assembly 130 to rotate in conjunction with the shaft 100. Conversely, when the notched collar 160 is disengaged from the pin 108—for example, as may occur by loosening the nut 140 and pulling the attachment end 134 away from the lift assembly 80—the handle assembly 130 remains stationary during rotation of the shaft (100). This disengaged configuration may be particularly useful when the movement of the handle assembly 130 may be an impediment to the work of users of the winch assembly 200. The handle 150 may be secured to the handle end 138 of the handle assembly 130 via a bolt or pin 152, which extends through a longitudinal axis of the handle 150.

The lifting assembly 80 further includes a ratchet subassembly 170, as shown in FIG. 17. The ratchet subassembly 170 includes a ratchet gear 172 and a pawl 174 and is driven by the rotation of the shaft 100. The interaction of the pawl 174 with the ratchet teeth 173 of the ratchet subassembly 170 prevents the unwanted reverse movement of the shaft 100, which might otherwise cause a rapid drop of the object being hoisted by the winch assembly 200.

The pawl 174 may be attached to the side wall 94b of the base 90 by a rivet 175 or other attachment element and may be seated upon a spring 176 positioned between the pawl 174 and the side wall 94b, the attachment element 175 being directed through the center of the spring 176. The ratchet teeth 173, in order to be engaged by the pawl 174, are appropriately aligned with the pawl 174 by a plurality of washers or spacers. One circular spacer 171, which is located between the ratchet gear 172 and the notched collar 160, includes a centrally located opening having the shape of a square with rounded corners, which corresponds in shape to the flat panels 107 of the protruded portion of the shaft 100.

The ratchet subassembly 170 is typically housed within a protective cover 180, illustrated to the left of the Figure to expose the underlying assembly 170. The cover 180 is secured to the exterior of the side wall 94b of the lift assembly 80 by bolts 182 positioned through holes 183 at the corners of the cover 180. The cover 180 further defines therethrough an orifice 186, through which the shaft 100 may extend.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is provided by way of example rather than by way of limitation, and the subject disclosure does not preclude inclusion of such modifications, variations and/or additions to the present subject matter as would be readily apparent to one of ordinary skill in the art.

I claim:

1. A portable winch assembly, the winch assembly being actuable by an auxiliary handheld torquing device, the winch assembly comprising:
   a planetary reduction gearbox, the gearbox comprising a primary sun gear, a secondary sun gear, a first plurality of planet gears, a second plurality of planet gears, and a ring gear;
   the primary sun gear including a drive head and a drive shaft, the drive head being configured for engagement with the auxiliary handheld torquing device;
   the first plurality of planet gears being carried by a first planet carrier, the first planet carrier including an aperture therethrough such that the drive shaft is positioned through the aperture and the first plurality of planet gears are operatively engaged with the primary sun gear;
   the secondary sun gear being positioned within the aperture in the first planet carrier, the secondary sun gear having an opening therethrough, the drive shaft being positioned through the opening;
   the second plurality of planet gears being carried by a second planet carrier, the second planet carrier including an aperture therethrough such that the drive shaft is positioned through the aperture and the second plurality of planet gears are operatively engaged with the secondary sun gear; and
   the ring gear encircling the primary sun gear, the first plurality of planet gears, the secondary sun gear, and the second plurality of planet gears, the ring gear being operatively engaged with the first plurality of planet gears and the second plurality of planet gears.

2. The portable winch assembly of claim 1, wherein the first plurality of planet gears consists of three gears having the same size and number of gear teeth.

3. The portable winch assembly of claim 2, wherein the primary sun gear has a prescribed number of gear teeth and each of the first plurality of planet gears has a greater number of gear teeth than the primary sun gear.

4. The portable winch assembly of claim 1, wherein the second plurality of planet gears consists of three gears having the same size and number of gear teeth.

5. The portable winch assembly of claim 4, wherein the secondary sun gear has a prescribed number of gear teeth and each of the second plurality of planet gears has a greater number of gear teeth than the secondary sun gear.

6. The portable winch assembly of claim 1, further comprising a reduction gearbox cover, the reduction gearbox cover defining therethrough a passage, the drive head of the primary sun gear being positioned through the passage.

7. The portable winch assembly of claim 6, further comprising a gearbox base, the gearbox base being located opposite the reduction gearbox cover and being configured to engage the ring gear on a side opposite the second planet carrier.

8. The portable winch assembly of claim 1, wherein the aperture through the second planet carrier has a shape resembling a truncated circle.

9. The portable winch assembly of claim 8, further comprising a lift assembly, the lift assembly including a U-shaped base having a horizontal center portion and oppositely disposed vertically extending side walls, each of the side walls defining a bore therethrough; and a rotatable shaft positioned through the bores in the base, one end of the rotatable shaft having a cross-sectional diameter having the shape of a truncated circle such that the one end of the rotatable shaft is operatively connected to the planetary reduction gearbox via the aperture of the second planet carrier.

10. The portable winch assembly of claim 9, the rotatable shaft further comprising a worm portion.

11. The portable winch assembly of claim 9, further comprising a lift gear, the lift gear being operatively engaged with the worm portion of the rotatable shaft.

12. The portable winch assembly of claim 11, further comprising a spool, the spool being configured for storage of one of a rope, a cable, and a strap, and further being in operative relationship with a spool gear, the spool gear being driven by engagement with the lift gear.

13. The portable winch assembly of claim 9, the rotatable shaft further comprising a threaded end, the threaded end being oppositely disposed from the truncated end.

14. The portable winch assembly of claim 13, further comprising a turnable handle assembly having a longitudinal strut and a handle, the longitudinal strut including an attachment end and a handle end opposite the attachment end, the attachment end of the longitudinal strut being secured to the threaded end of the rotatable shaft by a threaded nut, the handle being secured to the handle end of the longitudinal strut.

15. The portable winch assembly of claim 14, the handle assembly further comprising a notched collar, the notched collar being positioned at the attachment end of the handle assembly between the longitudinal strut and the lift assembly.

16. The portable winch assembly of claim 15, the rotatable shaft further comprising a pin, the pin extending upwardly from the rotatable shaft at a position between the threaded end and the lift assembly, the notched collar being configured to engage and disengage the pin.

17. The portable winch assembly of claim 16, wherein, when the notched collar is engaged with the pin, the handle rotates in conjunction with the rotatable shaft, and wherein, when the notched collar is disengaged from the pin, the handle remains stationary relative to the rotatable shaft.

* * * * *